United States Patent
Choi

(10) Patent No.: US 6,727,486 B2
(45) Date of Patent: Apr. 27, 2004

(54) CMOS IMAGE SENSOR HAVING A CHOPPER-TYPE COMPARATOR TO PERFORM ANALOG CORRELATED DOUBLE SAMPLING

(75) Inventor: Soo-Chang Choi, Ichon-shi (KR)

(73) Assignee: Hynix Semiconductor Inc, Kyoungki-Do (KR)

( * ) Notice: Subject to any disclaimer, the term of this patent is extended or adjusted under 35 U.S.C. 154(b) by 248 days.

(21) Appl. No.: 10/016,951

(22) Filed: Dec. 14, 2001

(65) Prior Publication Data

US 2002/0118289 A1 Aug. 29, 2002

(30) Foreign Application Priority Data

Dec. 14, 2000 (KR) ........................................ 2000-76618

(51) Int. Cl.[7] .............................................. H01L 27/00
(52) U.S. Cl. .................................. 250/208.1; 250/214.1
(58) Field of Search .......................... 250/208.1, 214.1, 250/214 R, 214 DC; 348/222.1, 241, 294, 300, 301; 341/172, 166; 257/290, 291

(56) References Cited

U.S. PATENT DOCUMENTS

| 5,877,715 | A |   | 3/1999 | Gowda et al. ............... 341/122 |
| 5,920,274 | A |   | 7/1999 | Gowda et al. ............... 341/155 |
| 5,982,318 | A | * | 11/1999 | Yiannoulos ................. 341/155 |
| 6,025,875 | A |   | 2/2000 | Vu et al. .................... 348/241 |
| 6,040,570 | A |   | 3/2000 | Levine et al. ............. 250/208.1 |
| 6,346,696 | B1 | * | 2/2002 | Kwon ...................... 250/208.1 |
| 6,423,957 | B1 | * | 7/2002 | Kim et al. ................ 250/208.1 |
| 6,456,170 | B1 | * | 9/2002 | Segawa et al. ............. 331/143 |

FOREIGN PATENT DOCUMENTS

| JP | 57-139973 | 8/1982 | .......... H01L/31/10 |
| JP | 01-125071 | 5/1989 | .......... H04N/5/335 |
| JP | 04-196688 | 7/1992 | .......... H04N/5/335 |
| JP | 10-304133 | 11/1998 | .......... H04N/1/028 |

* cited by examiner

Primary Examiner—Que T. Le
Assistant Examiner—Eric J Spears
(74) Attorney, Agent, or Firm—Marshall, Gerstein & Borun LLP

(57) ABSTRACT

A CMOS image sensor performing an analog correlated double sampling is disclosed. The CMOS image sensor may include an image capture device for capturing an image for analog image signal from an object an analog-to-digital converter for converting the analog image signal to a digital value using a ramp signal. In such an arrangement the analog-to-digital converter may includes a chopper-type comparator receiving the analog image signal and the ramp signal and a capacitor for receiving a start voltage of the ramp signal and charging a voltage level corresponding the start voltage of the ramp signal in a reset mode and for receiving a down-ramping signal of the ramp signal in a count mode in order to remove an device offset voltage. The analog-to-digital converter may also include a ramp signal generator providing the ramp signal to the analog-to-digital converter.

7 Claims, 9 Drawing Sheets

CMOS IMAGE SENSOR HAVING A CHOPPER-TYPE COMPARATOR TO PERFORM ANALOG CORRELATED DOUBLE SAMPLING

TECHNICAL FIELD

The invention relates to image sensors and, more particularly, to a complimentary metal oxide semiconductor (CMOS) image sensor able to perform analog correlated double sampling (CDS).

DESCRIPTION OF THE RELATED ART

Generally, an image sensor is an apparatus that captures images from objects by using the property that silicon semiconductors react with visible light. Most previous image sensors have used charge coupled devices (CCD) as image capturing devices.

However, current CMOS technology has matured to the point that the imagers implemented using CMOS transistors are becoming more popular. CMOS imagers have an advantage over CCD imagers in that supplementary analog and digital circuits can be integrated together with a CMOS image sensing portion on a single chip with very low cost, which makes it possible for the CMOS image sensor to have analog-to-digital conversion circuits and other image processing logic circuits integrated on a single imager.

The on-chip analog-to-digital conversion circuits are comprised of as many comparators as columns in a pixel array of the CMOS image sensor and the picture quality of the CMOS image sensor depends largely on the quality of these comparators that convert analog pixel signals into digital signals.

FIG. 1 is a block diagram illustrating a conventional CMOS image sensor with the function of correlated double sampling. As shown in FIG. 1, the conventional CMOS image sensor includes a pixel array 100, a comparator array 200, a line buffer 300, a ramp signal generator 400, a digital controller 500 and a row decoder 600. The pixel array 100 has unit pixels arranged in the Bayer Pattern and the ramp signal generator 400 generates a ramp signal (as a reference signal for comparison) that is required to find a digital value according to an input analog signal from the pixel. The line buffer 300 consists of 4 arrays of dynamic latch circuits to store the digital value from the comparator array 200 and the digital controller 500 controls the row decoder 600, the line buffer 300 and the ramp generator 400, and performs additional image signal processing. The row decoder 600 selects a specific row of the pixel array 100 to read out the analog pixel signals under the control of the digital controller 500.

When the row decoder 600 selects a row line of the pixel array 100, the analog pixel signals are input to the comparator array 200, along with the ramp signal produced by the ramp signal generator 400. The comparators of the comparator array 200 compare the analog pixel signals with the ramp signal to find the digital pixel signals for analog-to-digital conversion.

The comparator array 200 has as many comparators as columns in the pixel array 100 and these comparators perform the analog-to-digital conversion on a row-by-row basis. The converted digital data (signals) are stored in the line buffer 300 on a column by column basis. The digital pixel signals stored in the line buffer 300 are then transferred to the digital controller 500, which performs the image processing on them and then outputs the digital image signals through the output pins of the CMOS image sensor.

FIG. 2 is a block diagram illustrating the analog-to-digital conversion circuits of a column of the conventional CMOS image sensor in FIG. 1. Additionally, FIG. 3 is a waveform of ramp signal to be compared with the analog pixel signal. There are two ramps in the overall ramp signal, which actually perform two analog-to-digital conversions for correlated double sampling (CDS).

Referring to FIG. 2, analog-to-digital conversion is carried out by a comparator 210, which is a so-called column ADC(analog-to-digital converter), to compare the analog signal obtained from a unit pixel 110 with the ramp signal from the ramp signal generator 400. The resulting output signal of the comparator 210 controls the latch 310 to catch and keep the digital gray code that becomes a digital pixel signal in gray code. The gray counter (not shown) is used for minimal error owing to the asynchronous output signal of the comparator 210.

The unit pixel 110 includes a photodiode 32 to generate a voltage from an image of an object; a transfer transistor Tx to cut the current pass, which will give the photodiode the chance to collect the photo-generated electrons to produce the pixel voltage; and a source-follower (or drive) transistor Dx driven by the photodiode voltage transferred through the transfer transistor Tx, which has a function to safely transfer the pixel voltage to the comparator. The unit pixel 110 also includes a reset transistor Rx that has two functions, to flush out all the electrons in the photodiode and to apply a reset signal to a gate of the source-follower transistor Dx; a selection transistor Sx to let the source-follower voltage out to a comparator 210; and a bias current source Is to supply the bias current to the source-follower transistor Dx.

To reduce fixed pattern noise (FPN), correlated double sampling (CDS) is used when reading the pixel data. CDS includes two phases, reading reset voltage and reading data voltage. To read the reset voltage, the transfer transistor Tx should be turned off, the reset transistor Rx is to be on for a time long enough to charge the floating node connected to the gate of source-follower transistor Dx up to VDD and then off, and the select transistor Sx must be on to apply the output voltage of the source-follower to the comparator. After the completion of AD(analog-to-digital) conversion cycle, the digital value of the pixel reset voltage is stored in the reset bank of line buffer.

To read the data voltage, the transfer transistor Tx is turned on for some time long enough to complete the process of charge sharing of the photodiode and the floating node of the Dx transistor and then off, and the select transistor Sx is turned on to apply the data voltage of the transistor Dx to the comparator for AD conversion. During the second phase, the Rx transistor is always off. After the second phase, the digital value of pixel data is stored in the data bank of line buffer. The actual CDS process is carried out by the digital control block 500, which digitally subtracts the reset value from the data value, to filter out all the signal sources of fixed pattern noise.

The process of AD conversion of this imager is simple. When the ramp generator 400, a simple switched-capacitor integrator, starts to generate a ramp signal, the digital control block 500 starts to count the gray code and the gates of digital latches in the line buffer 300 controlled by the comparator 200 that compares the ramp signal (+) and the pixel voltage (−), opens the gates of latches when the ramp signal is higher than the pixel voltage, and closes the gates when it is lower are open and ready for the digital latches to follow the codes of the gray counter. The comparator 200 then closes the gates of latches in the line buffer 300 when the ramp signal is the same as, or lower than, the pixel voltage, which means that the latches of the column controlled by the comparator of that column keep the digital value in gray code converted from the analog pixel voltage. In other words, the ramp generator scans from the voltage higher than the maximum possible pixel voltage to the voltage lower than the minimum possible pixel voltage so that the comparator can convert all the analog pixel voltages to digital codes. The gray codes in the line buffer are then transferred to the digital control block 500, converted to the binary codes, and processed with the CDS operation after the completion of AD conversion of a full row of pixel voltages.

FIG. 4 is a circuit diagram of the conventional comparator of FIG. 2. However, the detailed description will be omitted because this CMOS differential amplifier is well known to those skilled in the art to which the subject matter pertains.

Typically, a CMOS differential amplifier has an offset voltage and, for the case that a few hundreds of comparators are implemented with such differential amplifiers, the offset voltages of the comparators are not uniform. Therefore, these mismatches of offset voltages of comparators result in the fixed pattern noise in the image captured by this imager. That is why CDS is important in this type of AD conversion. But the traditional CDS performed in the imager of FIG. 1 is done digitally, which causes quantization noise.

FIG. 5 is a block diagram of the line buffer 300 of FIG. 1. Referring to FIG. 5, two registers of 8-bit or 9-bit latch cells are required for one pixel value owing to CDS operation.

One weak point that the comparator implemented with the CMOS differential amplifier has is that when it is not actually comparing, the static bias currents are still flowing, which results in poor power efficiency. Poor efficiency is a serious defect when applying sensors to mobile applications.

Another weak point is that it is impossible to use a specific gamma correction for the pixel analog signals because the start voltage of the ramp signal is different from one another due to the various offset voltages of the comparators.

SUMMARY OF THE INVENTION

The disclosed CMOS image sensor may include an image capturer for capturing an image for analog image signal from an object and an analog-to-digital converter that converts the analog image signal to a digital value using a ramp signal. In such an arrangement, the analog-to-digital converter may include a chopper-type comparator receiving the analog image signal and the ramp signal and a first capacitor that receives a start voltage of the ramp signal and charging a voltage level corresponding the start voltage of the ramp signal in a reset mode and for receiving a down-ramping signal of the ramp signal in a count mode in order to remove an device offset voltage. The CMOS image sensor may also include a ramp signal generator providing the ramp signal to the analog-to-digital converter.

In a rest mode, the start voltage of the ramp signal is charged in the first capacitor and a reset voltage of the image capturer is simultaneously charged in the chopper-type comparator. In a charge transfer mode, the analog image signal from the image capturer is provided to the chopper-type comparator. In a count mode, the down-ramping signal of the ramp signal is provided to the chopper-type comparator in a count mode.

The disclosed apparatus may use analog correlated double sampling, which the CDS is carried out based on analog signals, rather than on conventional digital correlated double sampling carried out after converting analog signals from a pixel to digital signals.

In the disclosed apparatus, an analog signal and an offset voltage from a pixel of the CMOS image sensor are stored in a second capacitor, the ramp signal and the offset voltage are stored in a third capacitor, and then the offset voltage is removed by a switching operation between the second and third capacitors.

Also disclosed is a a method for removing a device offset voltage in a CMOS image sensor. The method may include charging a start voltage of a ramp signal in a capacitor and simultaneously charging a rest voltage of an image capturer in a chopper-type comparator in a reset mode and providing to the chopper-type comparator an analog image signal from the image capturer in a charge transfer mode. The method may also include providing a down-ramping signal of the ramp signal to the chopper-type comparator in a count mode.

DETAILED DESCRIPTION

Hereinafter, the disclosed apparatus will be described in detail referring to the accompanying drawings.

Figure 6:
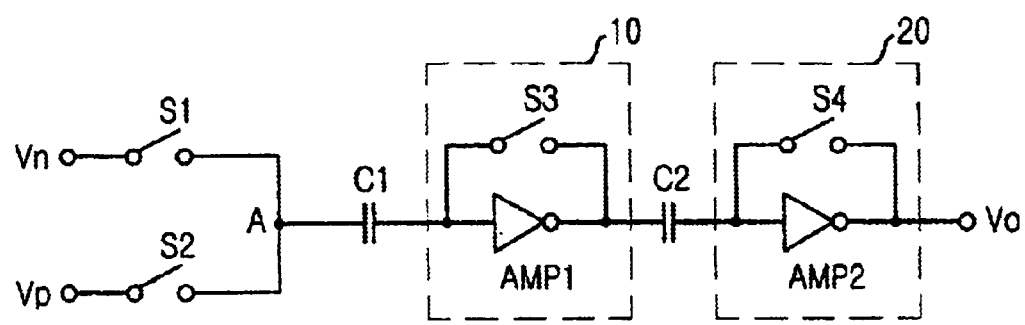
FIG. 6 is a circuit diagram illustrating a chopper-type comparator to be employed in a CMOS image sensor.

Referring to FIG. 6, a chopper-type comparator, which the disclosed apparatus employs, includes switches S1 and S2 to selectively connect input signal Vn or Vo to node A, a first stage 10 having an inverting amplifier IN1 and a switch S3 connected in parallel to the inverting amplifier IN1 and a capacitor C1 connected between node A and the first stage 10. The chopper-type comparator may also include a second stage 20 having an inverting amplifier IN12 and a switch S4 connected in parallel to the inverting amplifier IN12 and a capacitor C2 connected between the first and second stages 10 and 20. The capacitor C1 stores a clamp voltage of the first stage 10 and the capacitor C2 stores a clamp voltage of the second stage 20.

Figure 7:
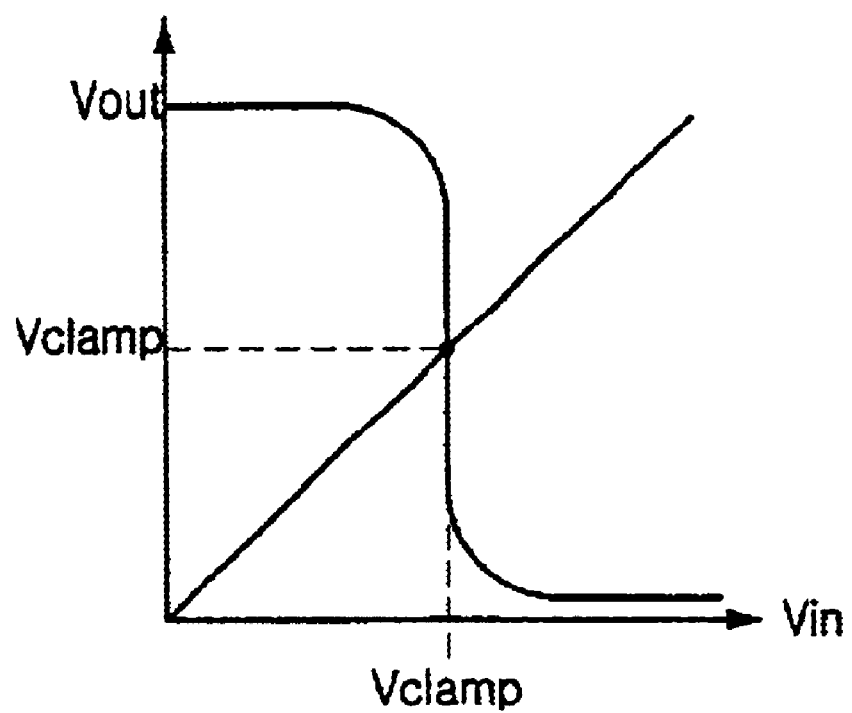
FIG. 7 is a transfer curve of the inverter amplifier illustrating a clamp voltage induced in capacitors of FIG. 6.

FIG. 7 is a waveform illustrating the clamp voltage induced in the capacitor of FIG. 6. If short circuits are respectively formed between the input and output terminals of the inverting amplifiers IN1 and IN2 through the switches S3 and S4, clamp voltages of the inverting amplifiers IN1 and IN2 are induced.

As mentioned above, the chopper-type comparator disclosed herein includes many switches S1 to S4. The switching operation of the switches S1 to S4 makes an offset voltage caused by charge injection as the following equation;

$$Voffset = Vth/(A1*A2)$$

where Vth is a logic threshold voltage to subsequently connected next digital circuit and A1 and A2 are gains of the first and second stages, respectively. However, this offset voltage is weaker than that in the conventional differential amplifier. Further, the larger the size of the first and second stages 10 and 20, the smaller the offset voltage.

It is possible to reduce the offset voltage by increasing the gains of the first and second stages 10 and 20 and the fixed pattern noise can be considerably reduced by the smaller offset voltage.

Figure 8:
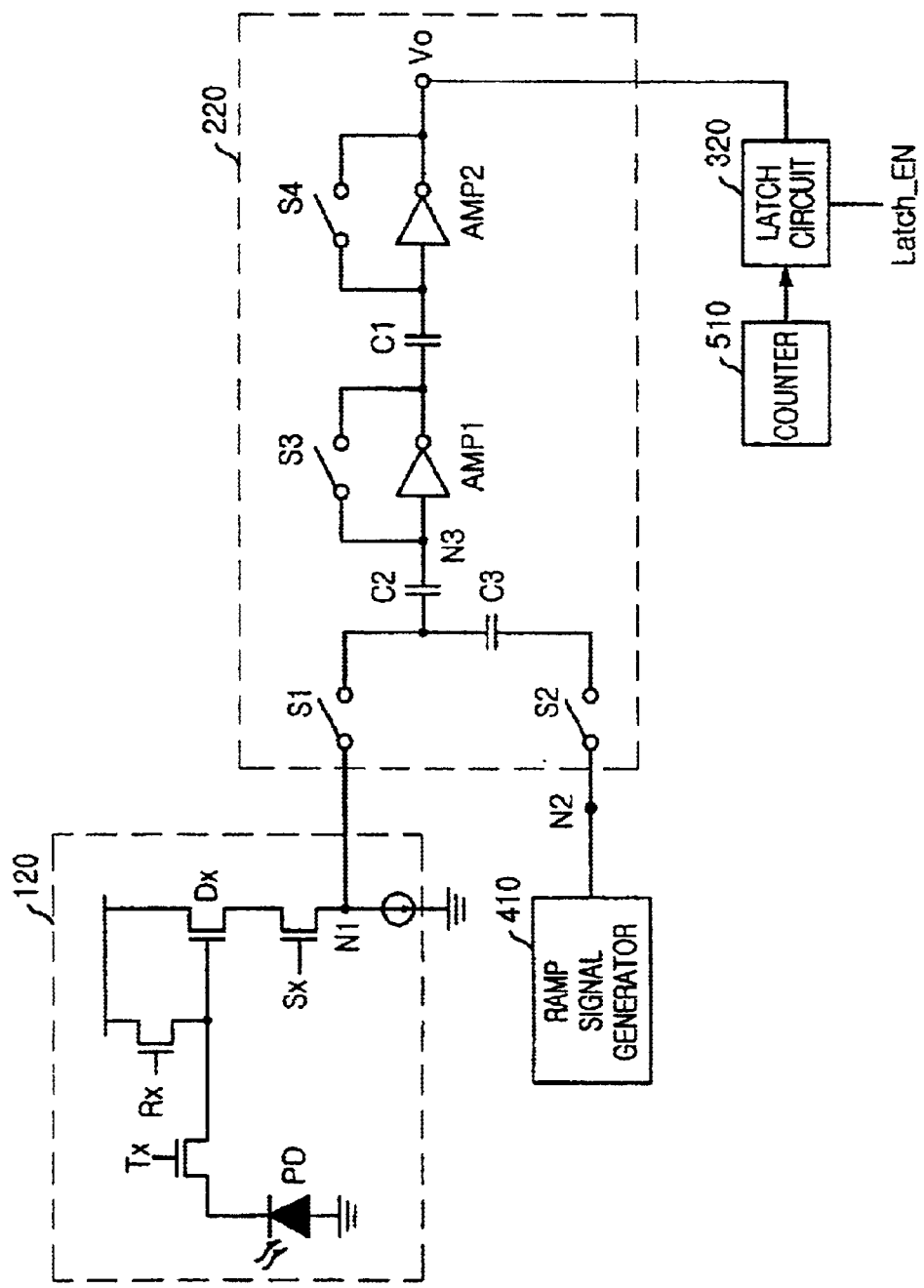
FIG. 8 is a circuit diagram illustrating a CMOS image sensor having the chopper-type comparator.

Referring to FIG. 8, the CMOS image sensor includes a chopper-type comparator 220, a unit pixel 120, a ramp signal generator 410, a latch circuit 320 and a counter 510 to calculate a digital value corresponding to an analog signal (typically, the counter is provided in a digital controller of the CMOS image sensor). In order to implement the correlated double sampling (CDS), the chopper-type comparator 220 has an additional capacitor C3 in the input terminal of the ramp signal so that the fixed pattern noise caused between the pixels may be improved.

Figure 9:
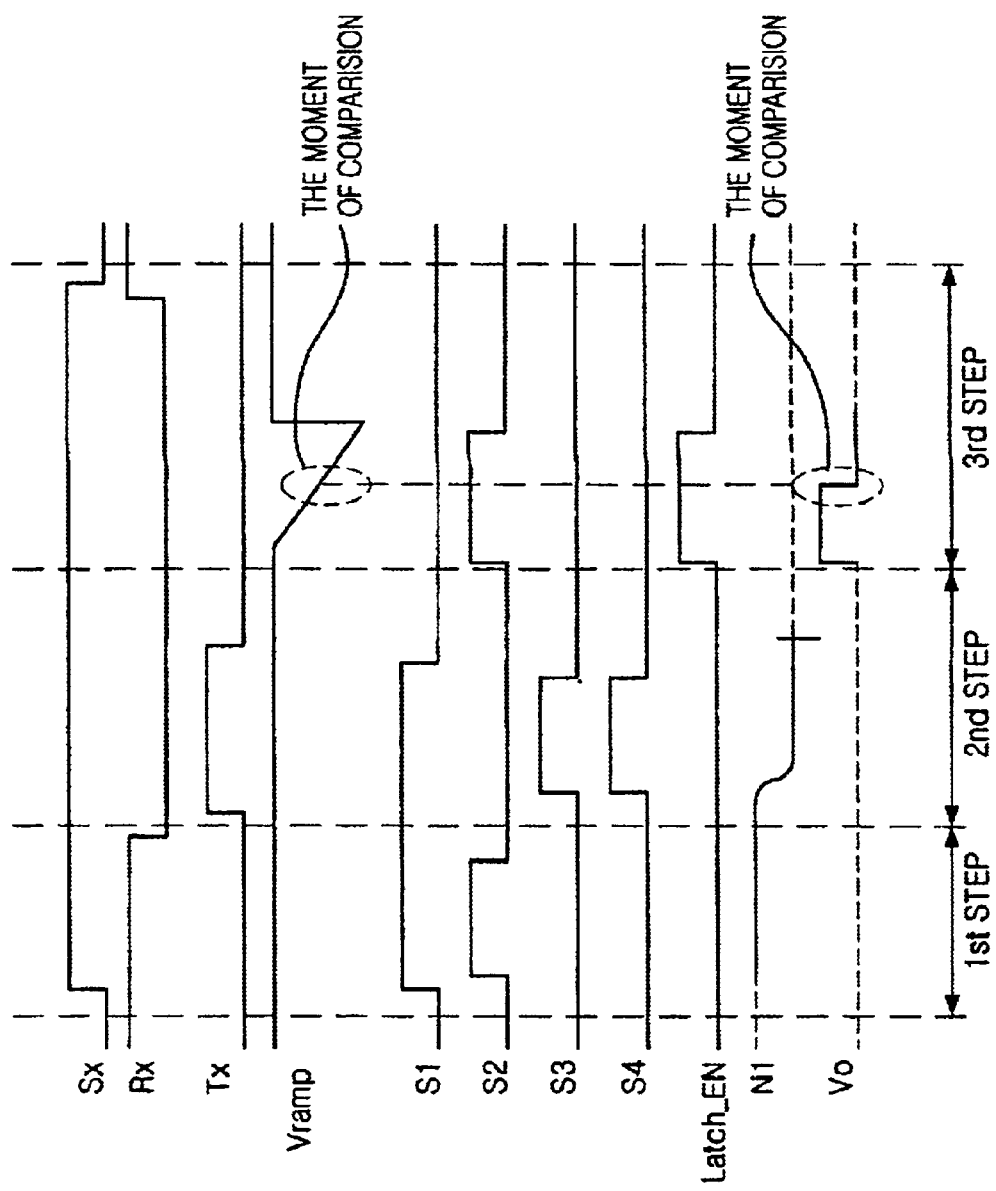
FIG. 9 is a timing chart useful in operating the chopper-type comparator of FIG. 8.

Referring to FIGS. 8 and 9, the chopper-type comparator 220 carries out the comparison through three steps. First, if a transfer transistor Tx is set to be turned off and a reset transistor Rx and a selection transistor Sx are set to be turned on, a reset level (Vrest) is induced at a source-follower transistor Dx and a voltage Vp (Vp=Vreset−Vth) is created at node N1. However, because the voltage Vth includes an offset voltage (Voffset), the more correct voltage Vp is given by:

VP=Vreset−(Vth+Voffset).

On the other hand, a starting voltage (Vstart) of a ramp voltage (Vramp) is applied to node N2 and, on this time, the voltage level at node N2 is Vramp (=Vstart).

Also, the switches S1 and S2 are turned on and a capacitor C3 stores a voltage level of VC3. Subsequently, the switch S2 is turned off immediately after a predetermined time to maintain such a stored voltage as shown in FIG. 9. The voltage Vc3 stored in the capacitor C3 is given by:

Vc3=Vrest−(Vth−Voffset)−Vstart

To apply an actual data from the unit pixel 120 to the comparator 220, the reset transistor Rx is tuned off and the transfer and selection transistors Tx and Sx are turned on so that the photocharges generated in the photodiode are applied to a gate of the source-follow transistor Dx. At this time, because the gate voltage of the source-follow transistor Dx is Vpixel, a voltage level on node N1 is Vn1 (=Vpixel−(Vth+Voffset)).

Subsequently, the switches S3 and S4 are turned on and then voltage levels of Vclamp1 and Vclamp2 are respectively induced in the capacitors C2 and C3 based on the operation voltage of the inverting amplifiers IN1 and IN2.

On the other hand, because the switch Si is continuously turned on, the capacitors C2 and C1 respectively stores voltage levels of Vc2 and Vc1 as follows:

Vc2=Vpixel−(Vth+Voffset)−Vclamp1

Vc1=Vclamp1−Vclamp2

In summary, the first and second stages mentioned above, 'Vreset−(Vth+Voffset)−Vstart' is sampled at the first stage and 'Vpixel−(Vth+Voffset)−Vclamp1' is sampled at the second stage. Accordingly, a double sampling for removing the offset voltages in the capacitors C3 and C2 can be achieved, which is called an analog correlated double sampling in the present disclosure.

At the third stage, the switches S1, S3 and S4 are turned off and the switch S2 is turned on to compare the ramp signal from the ramp signal generator 410 to the pixel voltage. Because the switches S1, S3 and S4 are turned off, the voltage levels of the capacitor C1, C2 and C3 are kept continuous, even if the switch S2 is turned on.

At this time, the input voltage (N3) of the inverting amplifier IN1 is given by:

VN3=Vramp+VC3−VC2=Vramp−Vstart+Vreset−Vpixel+Vclamp1

On the other hand, because the start voltage of the ramp signal is Vstart, VN3 is expressed as follow:

VN3=Vreset−Vpixel+Vclamp1

As shown in the above polynomial of VN3, the voltage levels of Vth and Voffset, which exist within the polynomials of VC3 and VC2, are removed; thereby achieving the analog correlated double sampling. The voltage level of "Vreset−Vpixel" is a net image data caused by the analog pixel data. Also, since the voltage of Vclamp1 is an operation voltage of the inverting amplifier IN1, the comparison can be obtained while the input voltage of the inverting amplifier IN1 becomes Vclamp1.

A latch enable signal Latch_EN is set to a high voltage level to drive the latch circuit 310 and a clock counting value of the counter 510 increases one by one as the ramp signal from the ramp signal generator 410 gradually decreases.

On the other hand, the ramp signal from the ramp signal generator 410 can be expressed as follow:

Vramp=Vstart−ΔV

Accordingly, the voltage level of VN3 can be expressed as follow:

VN3=(Vreset−Vpixel)−ΔV+Vclamp1

According to the feature of the ramp signal, the voltage level of ΔV gradually increases with the lapse of time and eventually it is the same as "Vreset−Vpixel." An input voltage of the inverting amplifier IN1 becomes "Vclamp1" and an input voltage of the inverting amplifier IN12 becomes "Vclamp2 simultaneously, so that the two inverting amplifiers IN1 and IN2 are at the operation voltage at the same time.

This point in time is the comparison moment and, if the ramp signal is dropped a little, the signal is amplified by the gains of the inverting amplifiers IN1 and IN2 and Vo is dropped to a ground voltage level.

If Vo is dropped to the ground voltage level, the final value, which is continuously counted by the counter 510, is stored in the latch circuit 320. Accordingly, the latched value is a digital value from the unit pixel 120.

Figure 1:
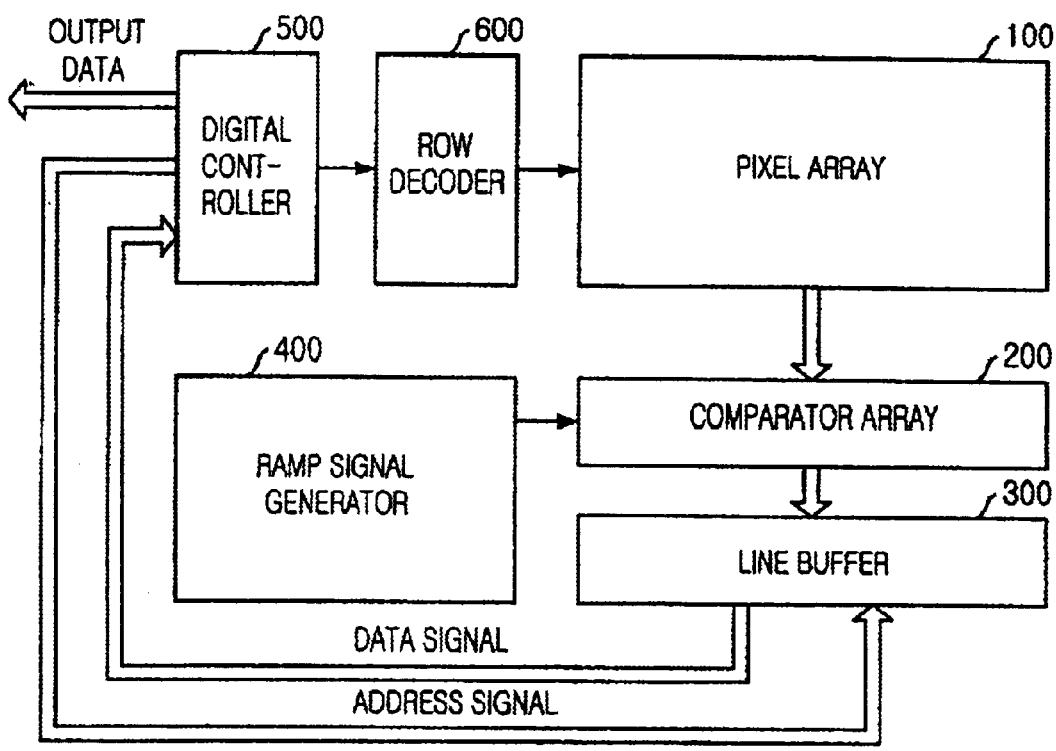
FIG. 1 is a block diagram illustrating a conventional CMOS image sensor with a correlated double sampling.
Figure 2:
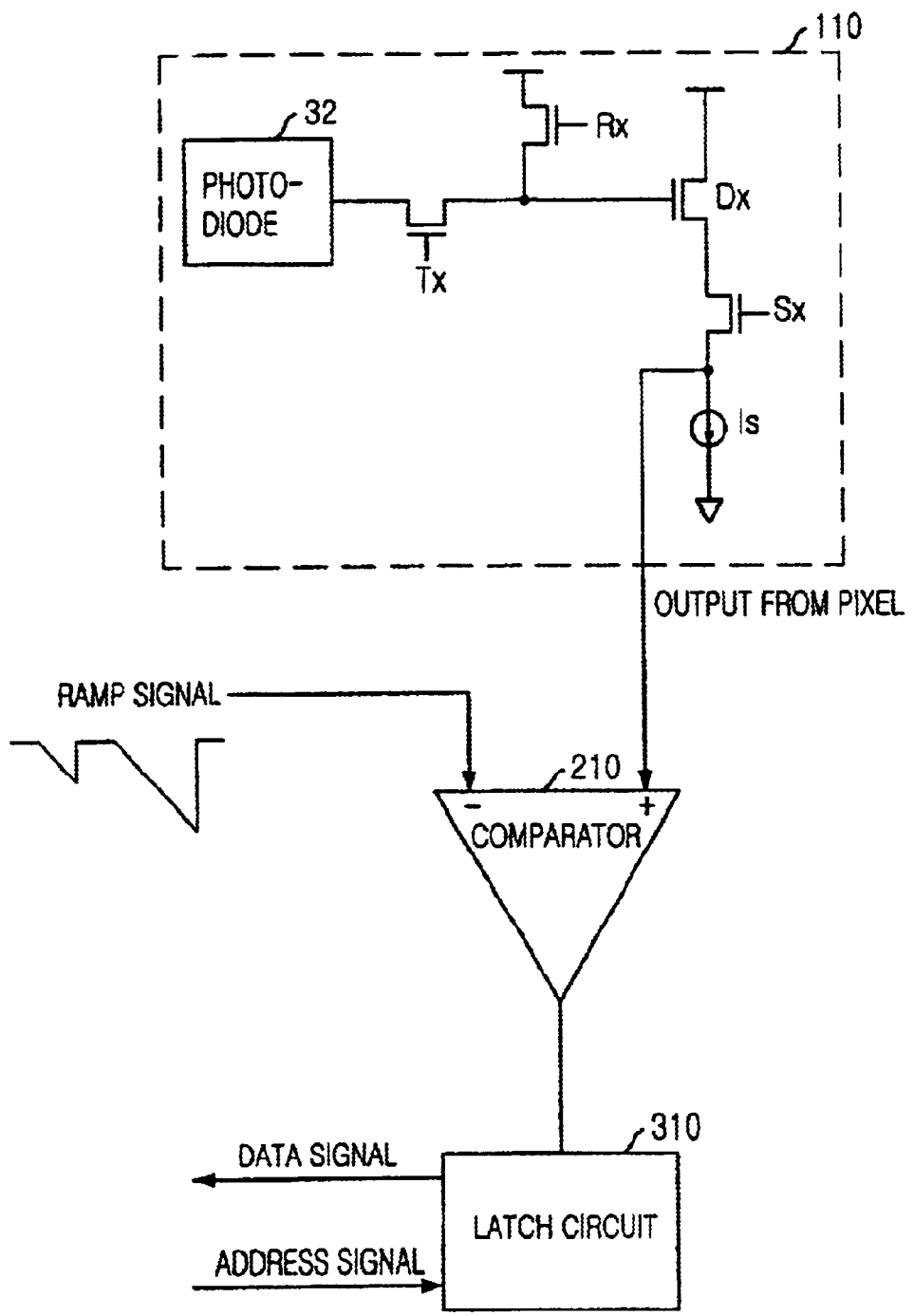
FIG. 2 is a block diagram illustrating the analog-to-digital conversion circuit of the conventional CMOS image sensor of FIG. 1.
Figure 3:
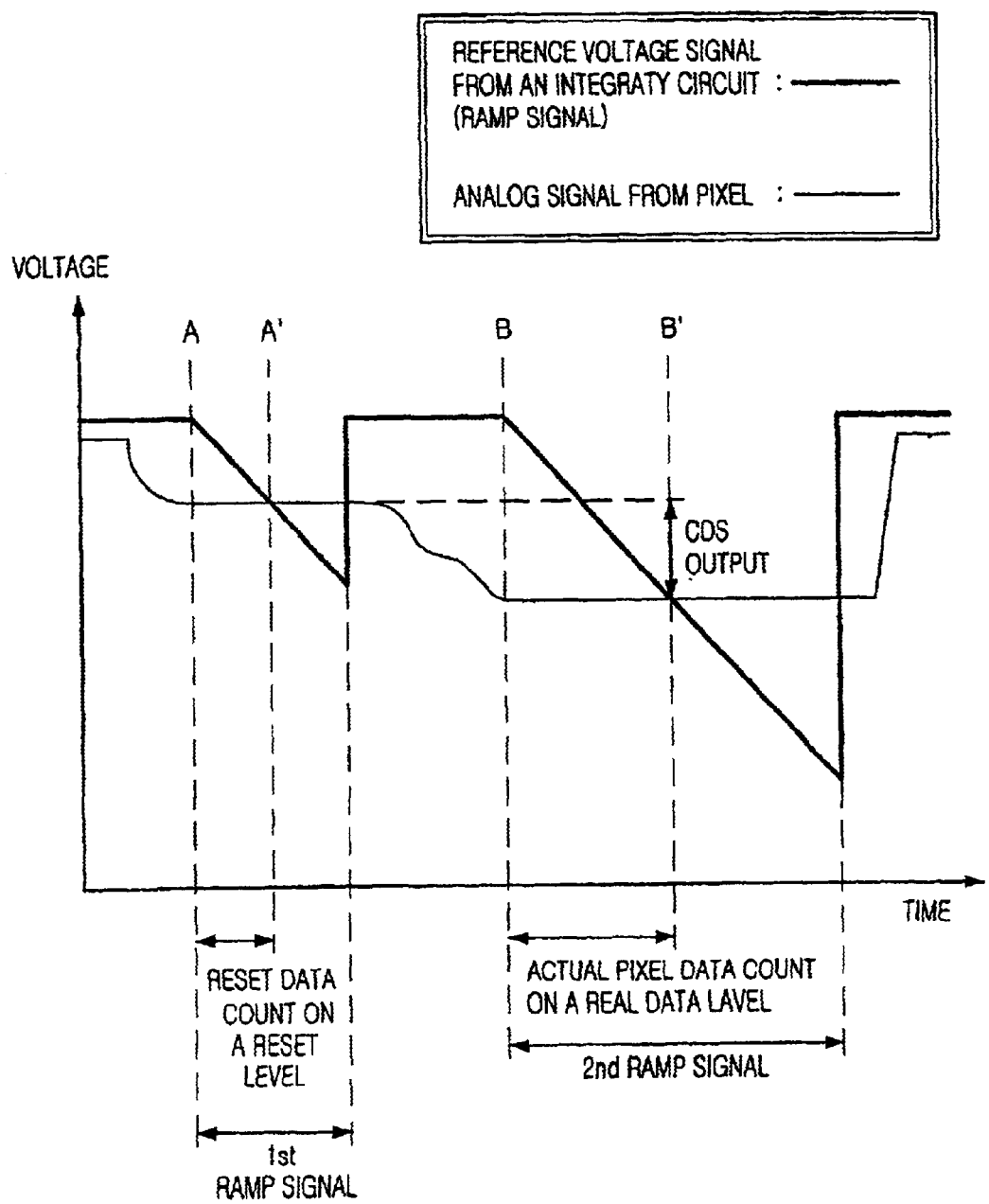
FIG. 3 is a waveform of ramp signal with an analog signal from a pixel in the correlated double sampling (CDS)
Figure 4:
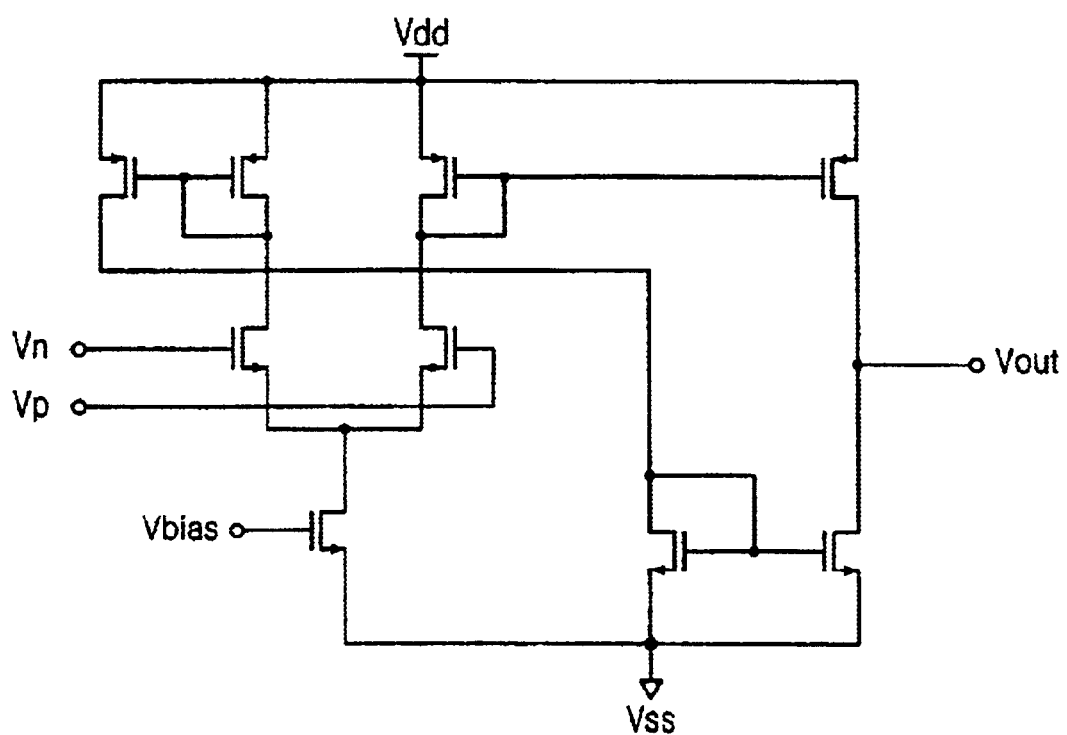
FIG. 4 is a circuit diagram of a conventional comparator of FIG. 2.
Figure 5:
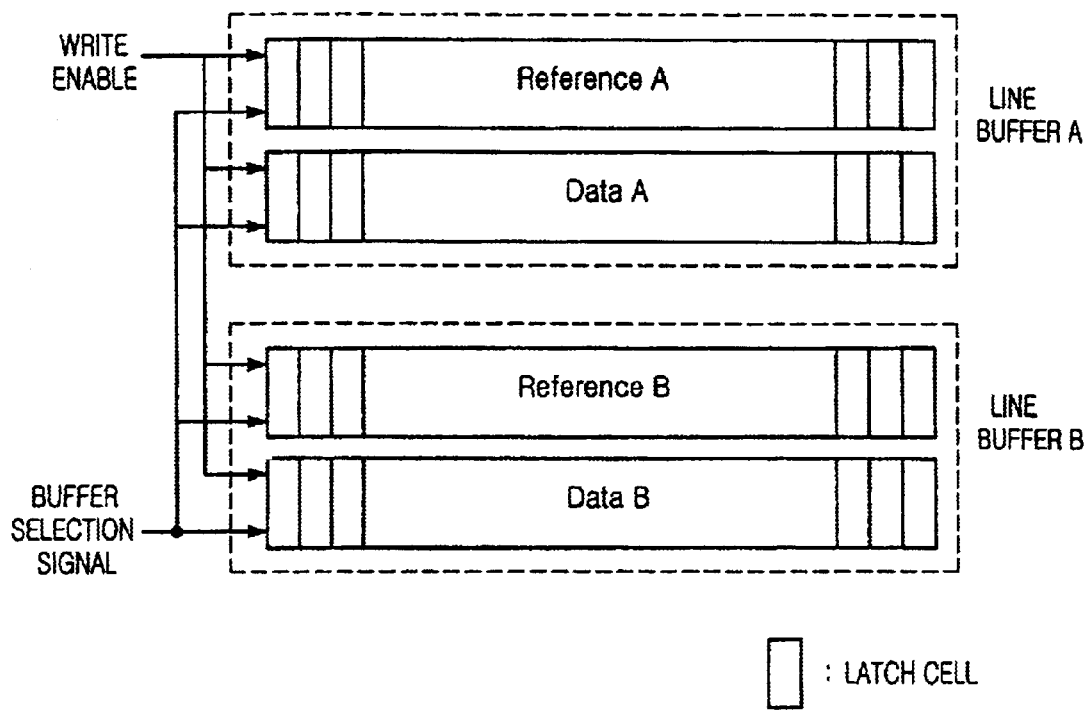
FIG. 5 is a block diagram of the line buffer of FIG. 1.

Finally, the latch enable signal Latch_EN is set to a logic low level in order to store the digital values in the latch circuit 320 until the data stored to latch 310 is transmitted to the digital controller (reference numeral 500 of FIG. 1).

The current of the comparator is consumed in the inverting amplifiers IN1 and IN2 only when the comparison is carried out so that there is little static current and it is possible to reduce the power consumption sharply. Also, because the comparator stores the reset level in the capacitor C3 in the analog signal level, only one ramp signal is required to obtain the digital signal corresponding to the input analog signal with the simple digital control algorithm and operations used in the CMOS image sensor. Further, because it is not necessary to store the digital value corresponding to the reset level of the CMOS image sensor, the entire size of the memories can be reduced by half.

As apparent from the above, the disclosed comparator can reduce the fixed pattern noise, such as the offset voltage, in the CMOS image sensor by considerably removing the offset voltage that exist between pixels using the analog correlated double sampling. The comparator can be made by a simple circuit design without a subtractor because only one ramp signal is used to obtain the digital value. Also, the ramp signal generator for the comparison can has a simple structure so that the chip size of the CMOS image sensor using the disclosed analog correlated double sampling is smaller than others using the digital correlated double sampling. Further, the disclosed apparatus may be employed in other integration circuits in which a low-voltage operation is required to reduce a power consumption or it is necessary to remove the offset value to obtain an exact digital value.

The comparator may have a simple structure that connects, in series, signal processing stages to process input data and the ramp signal. Further, the disclosed device may include a CMOS inverter with a low-operation voltage and a chopper type voltage comparator. Because the chopper type voltage comparator uses an inverter as a voltage amplifier, which consumes the current only when the comparison of inputs is carried out, the disclosed device can reduce the power consumption thereof.

The disclosure introduces a new architecture of CMOS image sensor that has many advantages over the previous one. Such advantages include smaller size of chip area, reduced power consumption, reduced FPN and possibility of implementing analog gamma correction. The disclosed CMOS image sensor is capable of reducing power consumption and a size of chip through the reduction of an offset voltage efficiently therein.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A CMOS image sensor comprising:
    an image capturer for capturing an image and producing an analog image signal from an object;
    an analog-to-digital converter for converting the analog image signal to a digital value using a ramp signal, wherein the analog-to-digital converter includes:
        a) a chopper-type comparator receiving the analog image signal and the ramp signal; and
        b) a capacitor for receiving a start voltage of the ramp signal and charging a voltage level corresponding the start voltage of the ramp signal in a reset mode and for receiving a down-ramping signal of the ramp signal in a count mode in order to remove a device offset voltage; and
    a ramp signal generator providing the ramp signal to the analog-to-digital converter.

2. The CMOS image sensor as recited in claim 1, further comprising a latch circuit for storing the digital value converted by the analog-to-digital converter, wherein the latch circuit has a plurality of buffer lines to store the digital value only.

3. The CMOS image sensor as recited in claim 1, wherein the capacitor is a first capacitor and wherein the chopper-type comparator comprises:
    a plurality of capacitors and switches; and
    at least two inverting amplifiers, wherein the switches are controlled by a digital controller in the CMOS image sensor.

4. The CMOS image sensor as recited in claim 3, wherein the chopper-type comparator comprises:
    a first switch connected to the image capturer;
    a second switch connected to the ramp signal generator;
    a second capacitor connected to the first switch, wherein the first capacitor is connected between the first switch and the second switch;
    a first inverting amplifier connected to the second capacitor;
    a third switch connected between input and output terminals of the first inverting amplifier;
    a third capacitor connected to the first inverting amplifier;
    a fourth switch connected between input and output terminals of the second inverting amplifier; and
    a second inverting amplifier connected to the third capacitor and the latch circuit to store the digital value.

5. The CMOS image sensor as recited in claim 4, wherein the first switch is turned on in response to a control signal from the digital controller in the rest mode and in a charge transfer mode in which photocharges are transferred to the analog-to-digital converter.

6. The CMOS image sensor as recited in claim 5, wherein the first third and fourth switches are turned on in response to a control signal from the digital controller in the charge transfer mode in which photocharges are transferred to the analog-to-digital converter.

7. A method for removing a device offset voltage in a CMOS image sensor, the method comprising:
    charging a start voltage of a ramp signal in a capacitor and simultaneously charging a rest voltage of an image capturer in a chopper-type comparator in a reset mode;
    providing to the chopper-type comparator an analog image signal from the image capturer in a charge transfer mode; and
    providing a down-ramping signal of the ramp signal to the chopper-type comparator in a count mode.

* * * * *

UNITED STATES PATENT AND TRADEMARK OFFICE
CERTIFICATE OF CORRECTION

PATENT NO. : 6,727,486 B2
DATED : April 27, 2004
INVENTOR(S) : Soo-Chang Choi

It is certified that error appears in the above-identified patent and that said Letters Patent is hereby corrected as shown below:

<u>Title page,</u>
Item [75], Inventor, after "Soo-Chang Choi," please delete "Ichon-shi" and insert
-- Kyoungki-do -- in its place.

Signed and Sealed this

Twenty-third Day of November, 2004

JON W. DUDAS
*Director of the United States Patent and Trademark Office*